(12) United States Patent
Shah et al.

(10) Patent No.: US 10,062,142 B2
(45) Date of Patent: Aug. 28, 2018

(54) STUTTER BUFFER TRANSFER TECHNIQUES FOR DISPLAY SYSTEMS

(71) Applicant: NVIDIA Corporation, Santa Clara, CA (US)

(72) Inventors: Rupesh Shah, Fremont, CA (US); Tyvis Cheung, Santa Clara, CA (US); Thomas Edward Dewey, Menlo Park, CA (US); Chris Cheng, Santa Clara, CA (US); Franciscus Sijstermans, Los Altos Hills, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 241 days.

(21) Appl. No.: 13/732,156

(22) Filed: Dec. 31, 2012

(65) Prior Publication Data

US 2014/0184625 A1    Jul. 3, 2014

(51) Int. Cl.
*G06T 1/60* (2006.01)

(52) U.S. Cl.
CPC ..................................... *G06T 1/60* (2013.01)

(58) Field of Classification Search
USPC ................................................. 345/557, 558
See application file for complete search history.

(56) References Cited

U.S. PATENT DOCUMENTS

| | | | | |
|---|---|---|---|---|
| 5,506,844 | A * | 4/1996 | Rao | H04J 3/1688 370/468 |
| 5,612,744 | A * | 3/1997 | Lee | H04N 19/105 348/416.1 |
| 5,699,076 | A * | 12/1997 | Tomiyasu | G09G 3/3644 345/103 |
| 2005/0122341 | A1* | 6/2005 | MacInnis | G06T 9/007 345/558 |
| 2010/0265260 | A1* | 10/2010 | Swic et al. | 345/539 |
| 2011/0264934 | A1* | 10/2011 | Branover et al. | 713/320 |
| 2011/0310980 | A1* | 12/2011 | Mathew | 375/240.26 |
| 2012/0108330 | A1* | 5/2012 | Dietrich et al. | 463/31 |
| 2012/0262463 | A1* | 10/2012 | Bakalash et al. | 345/501 |

* cited by examiner

*Primary Examiner* — Diane Wills

(57) ABSTRACT

Data transfer techniques include transferring display surface data from a memory subsystem into a stutter buffer at a first rate until the stutter buffer is substantially full. The memory interface and/or memory of the memory subsystem may then be placed into a suspend state until the stutter buffer is substantially empty. The display surface data is transferred from the stutter buffer to display logic at a second rate even when the memory subsystem is in a suspend state. The second rate, which is typically the rendering rate of the display, is substantially slower than the rate at which data is transferred into the stutter buffer.

19 Claims, 5 Drawing Sheets

STUTTER BUFFER TRANSFER TECHNIQUES FOR DISPLAY SYSTEMS

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, netbooks, smart phones, servers, and the like have facilitated increased productivity and reduced costs in communicating and analyzing, data in most areas of entertainment, education, business, and science.

Referring now to FIG. 1, a computing system, in accordance with the conventional art, is shown. The computing system 100 includes a memory subsystem 110, 140, a processing unit 120, and a display 130. The memory subsystem typically includes one or more memories 110 and one or more memory interface 140. The computing device 100 typically includes numerous other components, function blocks, internal and external peripheral and the like that are not germane to the understanding of embodiments of the present technology and therefore are not discussed further herein.

The memory subsystem 110, 140 among other things is used to store display surface data e.g., images) to be displayed on the monitor 130. The memory 110 is typically utilized as a frame buffer for displaying surface data in the computing system 100. The display surfaces data is rendered by the processing unit 120 on the monitor 130 as visual images. In an exemplary implementation, the processing unit 120 may be a graphics processing unit (GPU), central processing unit (CPU) or the like. The processing unit 120 includes multiple functional blocks 140-170 including a memory subsystem 110, 140 and display logic 160. The other functional blocks 170 of the processing unit 120, among other things, may include graphics pipeline, video decoder and/or the like.

The memory interface 140 is adapted to access the memory 110 for one or more functional blocks of the processing unit 120. For example, the memory interface 140 is adapted to store the display surface data generated by the other functional blocks 170 of the processing unit in a frame buffer of the memory. The memory interface 140 is also adapted to transfer the display surface data from the memory 110 for the display logic 150 for output on the monitor 130.

The memory subsystem 110, 140 may however be idle for periods of time after transferring data from the memory 110 to the display logic 160. In other situations the memory subsystem 110, 140 may be unavailable for periods of time. Accordingly, there is a continuing need for improved memory access techniques that may increase the utilization of the memory subsystem 110, 140 and/or allow the memory subsystem 110, 140 to be placed in a low power state more often.

SUMMARY OF THE INVENTION

The present technology may best be understood by referring to the following description and accompanying drawings that are used to illustrate embodiments of the present technology directed toward display data transfer using a stutter buffer.

In one embodiment of the present technology, a computing device includes a memory subsystem, a stutter buffer, display logic and a monitor. The memory interface may include memory interface communicatively coupled to memory. The display logic may be communicatively coupled to the monitor. The stutter buffer may be communicatively coupled between the memory subsystem and the display logic. The stutter buffer can be a separate functional block or may be integral to the memory subsystem or the display logic. The memory subsystem writes display surface data to the stutter buffer faster than the display surface data is read out of the display logic. The difference in the rates of writing and reading from the stutter buffer is adapted to enable periodically placing the memory subsystem in a suspend state or provide for when the memory subsystem are unavailable.

In another embodiment of the present technology, the computing device also includes compression logic and/or decompression logic. The compression logic may be communicatively coupled between the memory subsystem and the stutter buffer. The compression logic may be a separate functional block, may be integral to the memory subsystem, or may be integral to the stutter buffer. Similarly, the decompression logic may be communicatively coupled between the stutter buffer and the display logic. The decompression logic may be a separate functional block, may be integral to the stutter buffer, or may integral to the display logic. The memory subsystem writes display surface data compressed by the compression logic to the stutter buffer faster than the display surface data is read out of the display logic.

In yet another embodiment of the present technology, the stutter buffer data transfer process includes transferring display surface data from a memory subsystem into a stutter buffer at a first rate until the stutter buffer is substantially full. The memory interface, and optionally the memory, of the memory subsystem may then be placed into a suspend state until the stutter buffer is substantially empty. The display surface data is transferred from the stutter buffer to display logic at a second rate that is substantially slower than the first rate. The display interface and optionally the memory subsystem may be placed in a suspend state between when the writes of the display surface data substantially fill the stutter buffer and reads of the display surface data substantially empty the stutter buffer The process may be iteratively performed as necessary. In such case, the memory subsystem is turned back on when the stutter buffer is substantially empty. Additional display surface data is transferred by the display interface from the memory subsystem into the stutter buffer at the first rate until the stutter buffer is substantially full again. The memory subsystem is placed into a suspend state again until the stutter buffer is substantially empty again.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
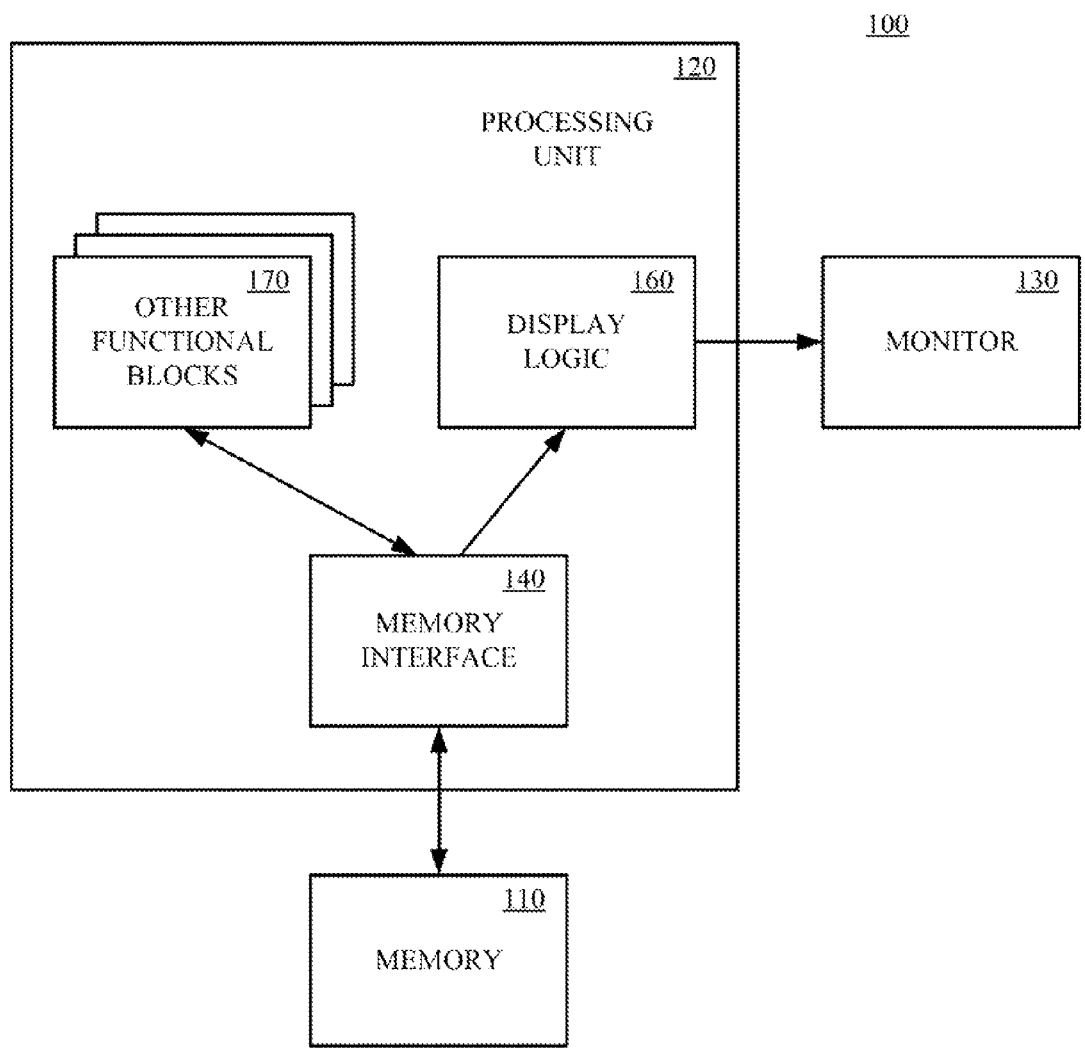
FIG. 1 shows a block diagram of a computing system according to the conventional art.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," a and/or the like, refer to the actions and processes of an electronic device such as an electronic computing device, that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Figure 2:
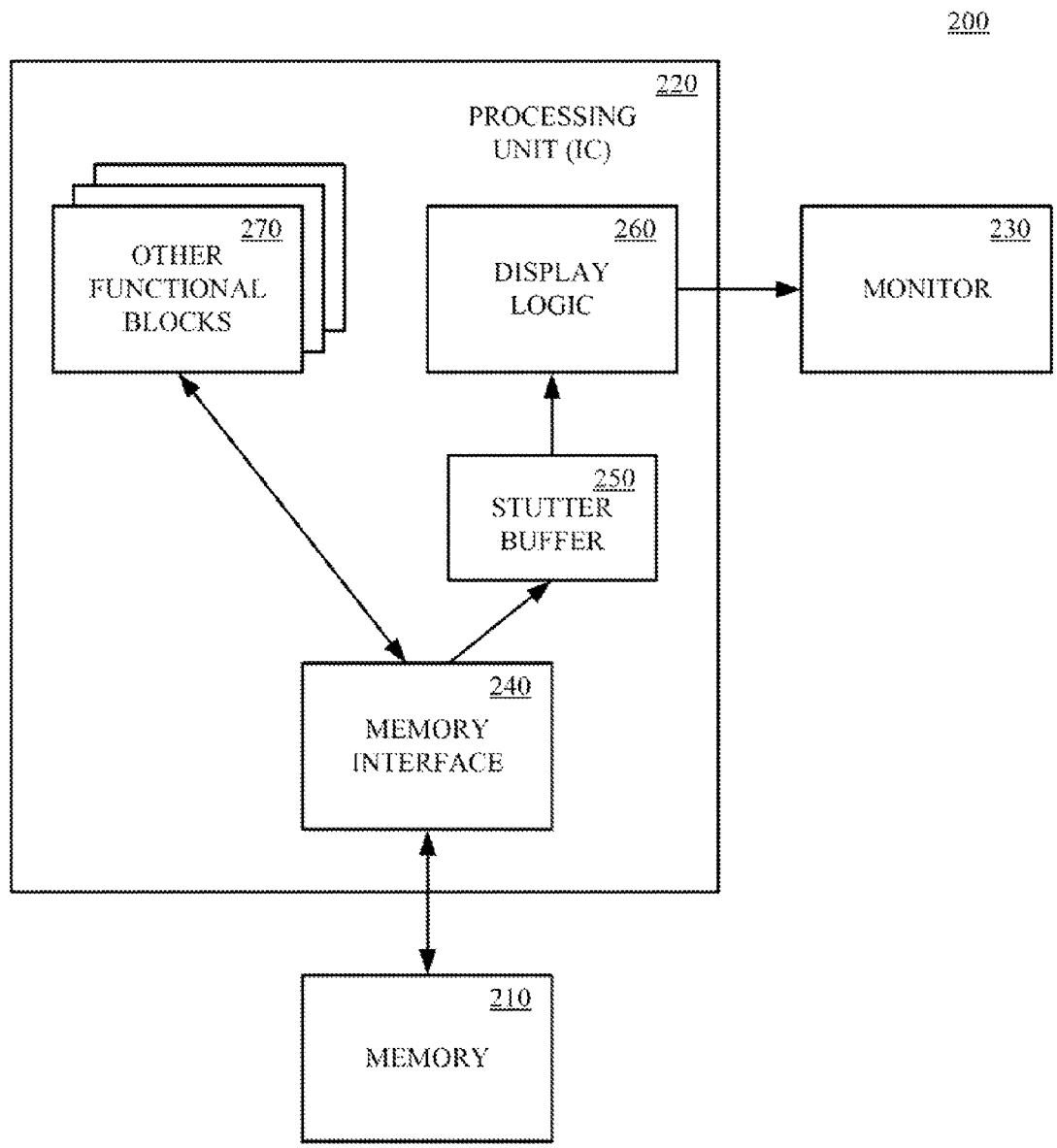
FIG. 2 shows a block diagram of a computing system, in accordance with one embodiment of the present technology.

Referring to FIG. 2, a computing system, in accordance with one embodiment of the present technology, is shown. The computing system 200 includes a memory subsystem 210, 240, a processing unit 220, and a display 230. The memory subsystem may include one or more computing device readable media 210 and one or more memory interfaces 240. The computing device readable media 210 is referred to herein after as memory and is adapted to store computing device executable instructions and/or data. The memory subsystem 210, 240 among other things is used to store display surface data (e.g., images) to be displayed on the monitor 230. The memory 210 may be dynamic random access memory (DRAM), in one implementation, which is utilized as a frame buffer in the computing system 200. The display surfaces data is rendered by the processing unit 220 on the monitor 230 as visual images. In an exemplary implementation, the processing unit 220 may be a graphics processing unit (GPU), central processing unit (CPU) or the like. The processing unit 220 includes multiple functional blocks 240-270 including a memory interface 240, a stutter buffer 250 and display logic 260. The other functional blocks 270 of the processing unit 220, among other things, may include graphics pipeline, video decoder and/or the like.

The described organization of the processing unit 220 is only representative. It is appreciated that the functional blocks may be combined with other functions into other functional blocks or may be further divided out into separate functional blocks. For example, the stutter buffer 250 may be implemented between the memory subsystem 210, 240 and the display logic 260, or as an integral part of the memory subsystem 210, 240 or the display logic 260.

The memory interface 240 is adapted to access the memory 210 for one or more functional blocks of the processing unit 220. For example, the memory subsystem 210, 240 is adapted to store the display surface data generated b the other functional blocks 270 of the processing unit in a frame buffer of the memory 210. The memory subsystem 210, 240 is also adapted to transfer the display surface data from the memory 210 for the display logic 260 for output on the monitor 230.

More particularly, the stutter buffer 250 and the memory interface 240 are adapted to read display surface data relatively fast from the memory 210 to fill most of the stutter buffer 250 and then stop reading, until the stutter buffer 250 is almost empty. The stutter buffer 250 and display logic 260 are adapted to render the display surface data to the monitor 230 at a substantially constant but relatively slow rate. In addition, the display logic 260 may perform processing, on the display surface data, and sends the results to the monitor using standards such as (VGA), (HDMI), or (DP).

Figure 3:
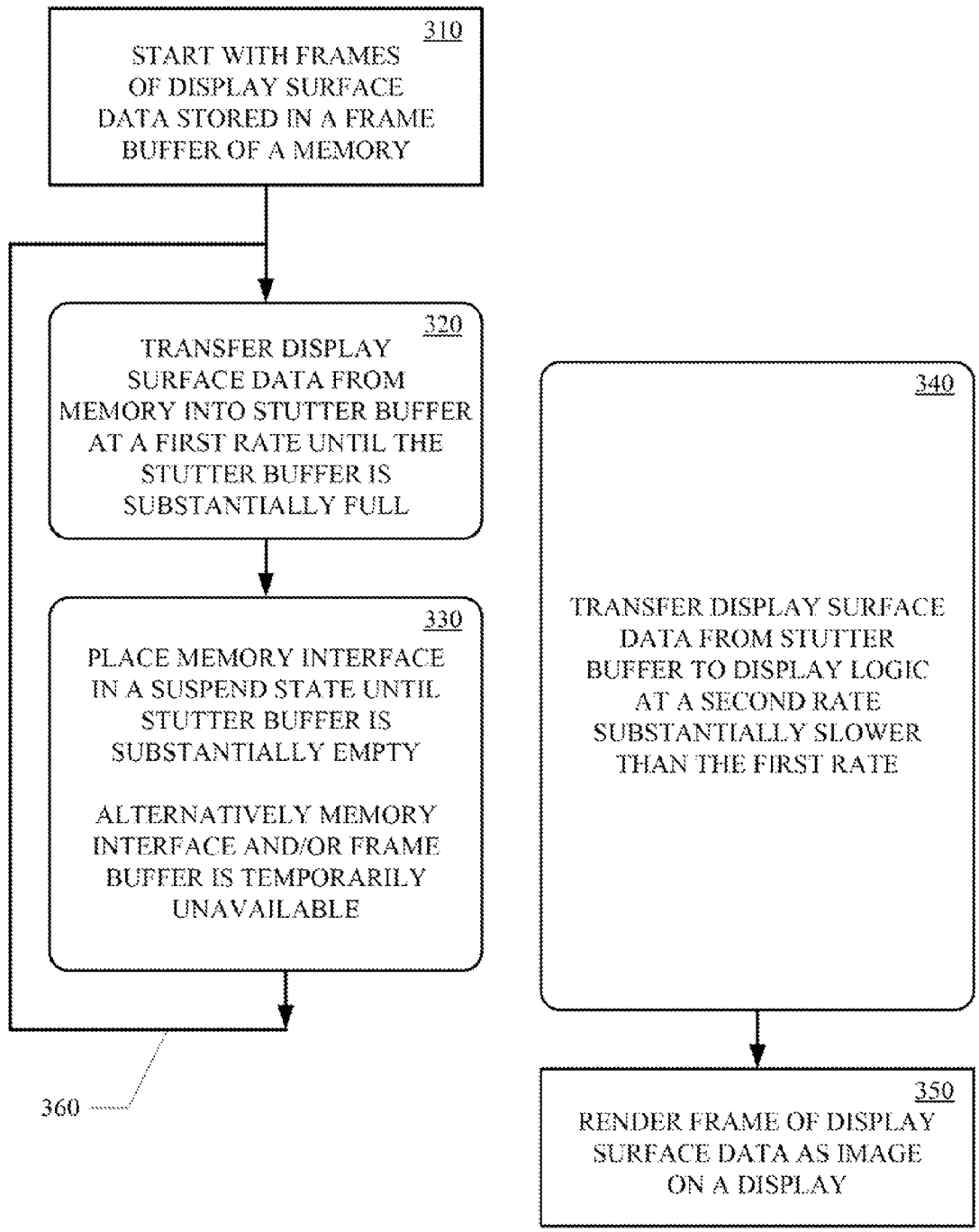
FIG. 3 shows a flow diagram of a method of stutter buffer transfer of data from a memory subsystem and to a monitor of a computing device, in accordance with embodiments of the present technology.

The operation of the computing systems of FIG. 2 will be further explained with reference to FIG. 3. The method of reading data from the memory subsystem and writing the data to the monitor, in accordance with embodiments of the present technology, may begin with frames of display surface data stored in a frame buffer of a memory subsystem, at 310. The stutter butter and memory subsystem read the display surface data of one or more frames at a first rate, at 320. The first rate at which the stutter buffer is filled is substantially faster than the frame render rate on the display, which is substantially the rate at which the stutter buffer is emptied by the display logic.

At 330, the memory subsystem stops reading surface data from the memory into the stutter buffer and the memory subsystem is placed in a suspend state, such as off, a low power state, sleep state or the like. The stutter buffer is adapted to store enough pixel data between the frame buffer and the display engine so that the memory subsystem a can be suspended. It may also be possible to place to memory system in a suspend state, such as off, a low power state, sleep state or the like, while the memory interface is also in a suspend state. Placing the memory subsystem in a suspend state can also allow the memory to perform memory refresh operations, which are required for DRAMs and the like.

Alternative, the memory subsystem may be temporarily unavailable. For example, the memory subsystem may be temporarily unavailable to support memory clock switching when outputting to two displays. For instance, the memory clock, which is the clock that the frame buffer runs on, may need to change when the load on the memory subsystem changes. The system can run at the lowest, memory clock to support the load. However, the memory clock cannot change while there are still outstanding request to the frame buffer. In such case memory clock switching would be done during vertical blanking of the display between image frames when there are no memory requests. However, if there are two displays running, at different resolution/refresh rates, then it is difficult to line up the vertical blanking, intervals of the two displays. In such case, the memory pool provided by the stutter buffer can be used to store the pixels for one display head and the memory clock switch can happen while one display head is in its active region and one display head is in vertical blanking.

At 340, the surface data is read out of the stutter buffer to the display engine at the frame rendering rate to the display. The frame rendering rate is substantially constant and is less than the rate at which display surface data is transferred from the frame buffer of the memory subsystem into the stutter buffer. The frame of display surface data is then rendered as in image on the display, at 350

The memory subsystem is turned back on and the processes of 320 and 330 are iteratively repeated each time the stutter buffer is substantially emptied by the transfer of display surface data from the stutter buffer to the display engine, at 360. Therefore, the memory interface and optionally the memory of the memory subsystem need only be turned on when the number of pixels in the stutter buffer tails below a predetermined threshold.

Figure 4:
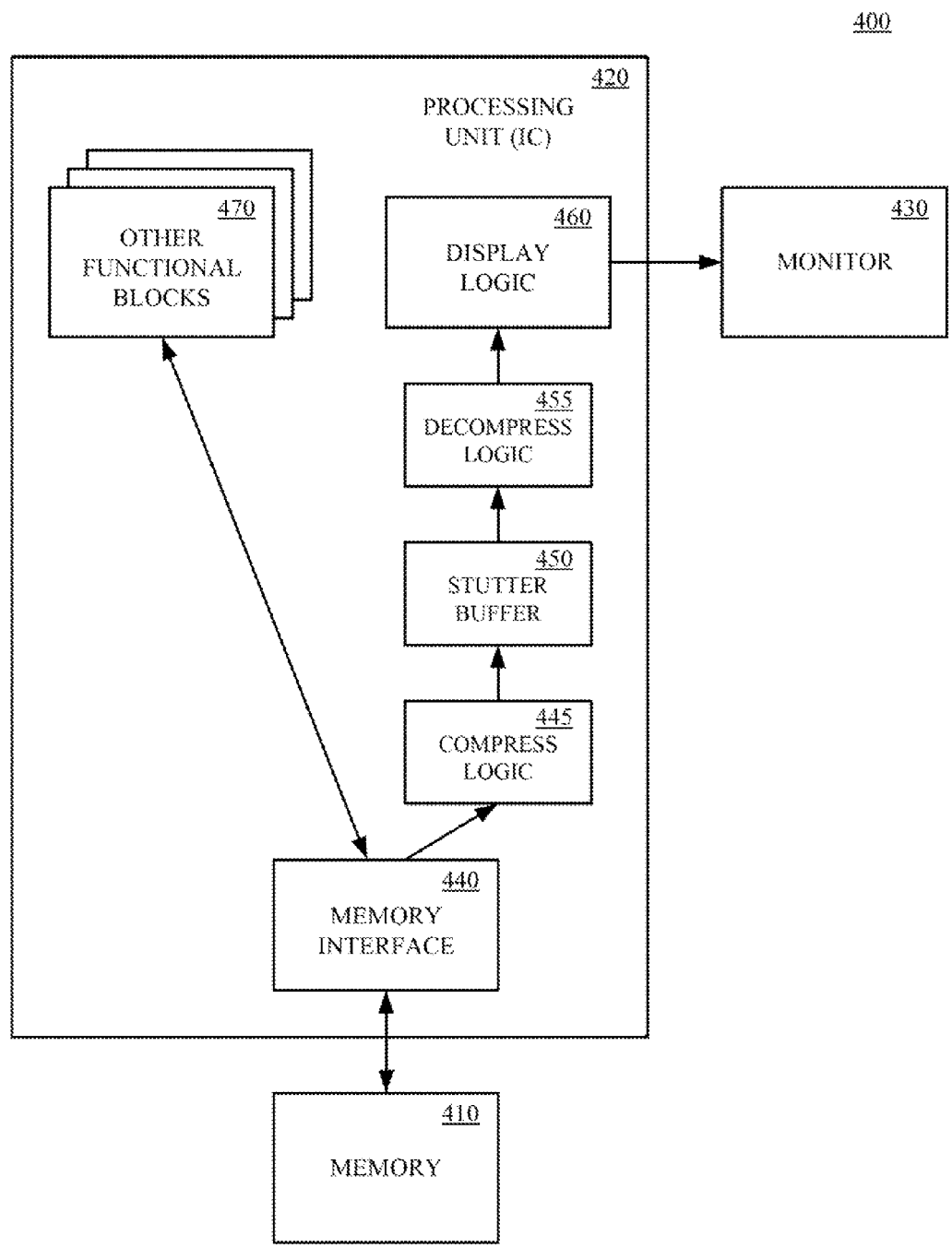
FIG. 4 shows a block diagram of a computing system, in accordance with another embodiment of the present technology.

Referring now to FIG. 4, a computing system, in accordance with another embodiment of the present technology, is shown. The computing system 400 is similar to the computing system described above with regard to FIG. 2. The computing system 400 includes a computing subsystem 410, 440, a processing unit 420, and a display 430. The memory subsystem 410, 440 among other things is used to store display surface data (e.g., images) to be displayed on the monitor 430. The display surfaces data is rendered by the processing unit 420 on the monitor 430 as visual images. In an exemplary implementation, the processing unit 420 may be a graphics processing unit (GPU), central processing unit (CPU) or the like. The processing unit 420 includes multiple functional blocks 440-470 including a memory interface 440, compression logic 445, a stutter buffer 450, decompression logic 455, and display logic 460. The other functional blocks 470 of the processing unit 420, among other things, may include graphics pipeline, video decoder, and/or the like.

The described organization of the processing unit 420 is only representative. It is appreciated that the functional blocks may be combined with other functional blocks or may be further divided out into separate functional blocks. For example, the stutter buffer 450 may be implemented between the memory subsystem 410, 440 and the display logic 460 or s an integral part of the memory subsystem 410, 440, compression logic 445, display logic 460, decompression logic 455, and or the like. In another example, the compression logic 445 or the decompression logic may not implemented if for example, the display surface data stored in the memory subsystem 410, 440 is in a compressed format or data decompression is implemented in the display 430.

The memory interface 440 is adapted to access the memory 410 for one or more functional blocks of the processing unit 420. For example, the memory subsystem 410, 440 is adapted to store the display surface data generated by the other functional blocks 470 of the processing unit 420 in a frame buffer of the memory 410. The memory interface 440 is also adapted to transfer the display surface data from the memory 410 to the display logic 460.

More particularly, display surface data being transferred from the memory 410 to the stutter buffer 450 by the memory interface 440 is compressed by the compression logic 445 before it is stored in the stutter buffer 450. Likewise, the display surface data being transferred from the stutter buffer 450 to the display logic 460 is decompressed by the decompression logic 455. The stutter buffer 450, compression logic 445 and the memory interface 440 are adapted to read display surface data from the memory 410 to fill most of the stutter buffer 450 relatively fast, and then stop reading until the stutter buffer 450 is almost empty. The stutter buffer 450, decompression logic 455 and display logic 460 are adapted to render the display surface data to the monitor 430 at a substantially constant rate. The rate at which the display surface data is read from the stutter buffer 450 for rendering is typically slower than the rate at which the display surface data is written to the stutter buffer 450.

Figure 5:
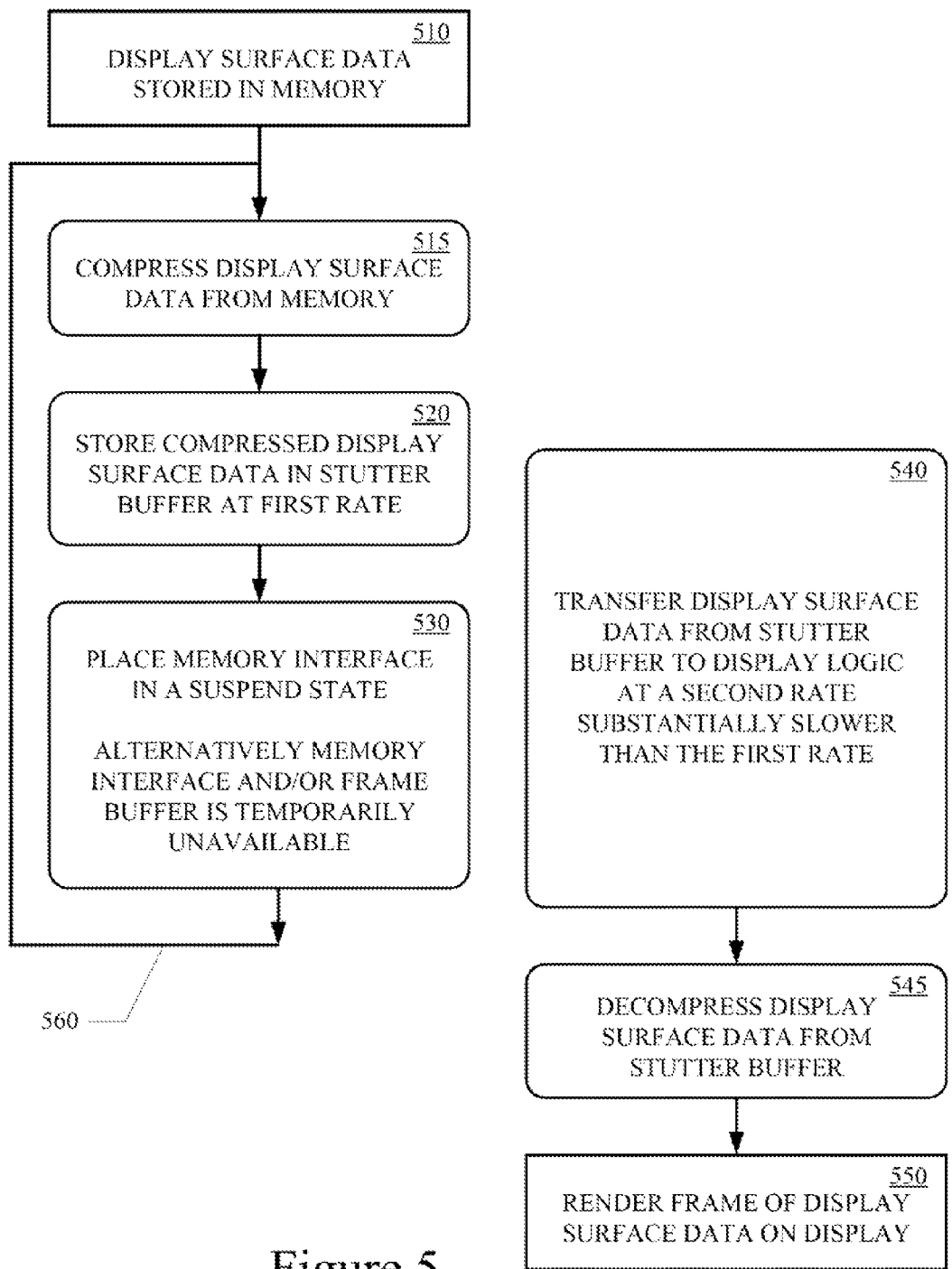
FIG. 5 shows a flow diagram of a method of stutter buffer transfer of data from a memory subsystem and to a monitor of a computing device, in accordance with embodiments of the present technology.

The operation of the computing, systems of FIG. 4 will be further explained with reference to FIG. 5. The method of reading data from the memory and writing the data to the monitor, in accordance with embodiments of the present technology, may begin with frames of display surface data stored in a frame buffer of a memory subsystem, at 510. When the memory subsystem transfers display surface data to the stutter buffer, the display surface data is compressed, at 515. In one embodiment, the compression algorithm may include a prediction step and a variable length coding step.

It is to be appreciated, that compression performance depends heavily on the prediction technique and the actual codeword generation. Furthermore, the decompression technique also needs to be considered while selecting the compression algorithm. Therefore, in one implementation, the compression algorithm may be a constant length in, variable length out Huffman code algorithm. The pixel values are predicted based on previous pixels, and each 64 bytes of differential pixel data is coded into a single codeword. In order to avoid using, a line buffer, each pixel may be predicted based upon its left neighbor. The first pixel (e.g., left most) of each line may be encoded with a zero prediction. Such prediction costs the least area and works reasonably well on both natural and artificial images. Higher order delta predictions may be unstable and usually produce inferior results. For instance test images that were run through an arch simulation produced compression rates that were worse than just using the left neighbor.

The pixel values are compressed as the difference between the actual pixel and the predicted pixel value. In order to avoid data expansion before variable length code, the differences are allowed to overflow or underflow. The codeword generation depends on the pixel format, but generally each code word can be split into three sections. The three sections include a header, an identifier, and the pixel data. The header may be a fixed size. There may be one identifier per pixel, and its size may be fixed for each header. The pixel data may be a fixed size for each identifier. The length of the packet, in such cases, can be derived by parsing the header and the sixty four (64) identifiers, without decoding all pixel values. It is to be appreciated that it should be possible to get the length of the codeword in a single cycle, while the remainder of the decoding can be pipelined. In an exemplary implementation, there is a slight gain to encode a 16×4 block of pixels, instead of 64×1 pixels, in a single codeword. However, it may be less consistent and almost negligible compared to the one-dimensional versus two-dimensional prediction difference.

The compressed display surface data is written to the stutter buffer at a first rate, at 520. The first rate at which the stutter buffer is filled is substantially faster than the frame render rate of the display, which is the rate at which the stutter buffer is emptied by the display logic.

At 530, the memory interface stops transferring display surface data from the memory subsystem into the stutter buffer and the memory subsystem is placed in a suspend state. The suspend state may be a sleep state (e.g., low power), an off state, or the like. The stutter buffer is adapted to allow enough pixel data storage between the frame buff and the display engine so that the memory interface can be placed in the suspend state. It may also be possible to place to memory in a similar suspend state, while the memory interface is also in a suspend state. Placing the memory interface in a suspend state can also allow the memory to perform memory refresh operations, which are required for DRAMs and the like.

Alternative, the stutter buffer may be adapted for use when the memory subsystem is temporarily unavailable. For example, the memory subsystem may be temporarily unavailable to support memory clock switching, when outputting to two displays. For instance, the memory clock, which is the clock, that the frame buffer runs on, may need to change when the load on the memory changes. The system can run at the lowest memory clock to support the load. However, the memory clock cannot change while there are still outstanding request to the frame buffer. In such case memory clock switching would be done during vertical blanking of the display between image frames when there are no memory requests. However, if there are two displays running at different resolution/refresh rates, then it is difficult to line up the vertical blanking intervals of the two displays. In such case, the memory pool provided by the stutter buffer can be used to store the pixels for one display head and the memory clock switch can happen while one display head is in its active, region and one display head is in vertical blanking.

At 540, the compressed display surface data is read out of the stutter buffer at a second rate. The second rate is typically slower than the first rate at which the compressed display surface data is written into the stutter buffer. The compressed display surface data is decompressed and transferred to the display engine, at 545. In one embodiment, the compression operates on sixteen pixels (512 bit original data) at a time. Each of the packets are restored to fixed length and put into a first-in-first-out buffer that crosses the block boundary to pixel clock. The compression is designed in a way that allows the size of each compressed packet to be calculated in a single cycle. The final decoding step of adding the left pixel value to the current pixel value (differential encoding) is done in a single pixel clock to minimize both the storage and logic requirements of the decompression logic.

The frame of decompressed display surface data is then rendered as in image on the display, at 550. The second rate is typically the frame rendering rate which substantially constant and is less than the rate at which display surface data is transferred from the frame buffer of the memory subsystem into the stutter buffer.

The memory subsystem is turned, back on and the processes of 515, 520 and 530 are iteratively repeated each time the stutter buffer is substantially emptied, at 560. Therefore, the memory interface and optionally the memory need only be turned on when the number of pick in the stutter buffer falls below a predetermined threshold.

The amount of time that the memory interface and optionally the memory remain in the suspend state depends upon the size of the stutter buffer and the rendered display resolution. In a typical computing device the memory interface and optionally the memory may be turned of for 90% of time in accordance with embodiments of the present technology. Turning of the memory interface or the memory interface and memory acts to conserve power. The power conservation is particularly advantageous in battery operated devices and the like, such as laptop personal computers (PC), netbooks, tablet computers, smartphones and the like.

It is also to be appreciated, that the bigger the memory pool provided by the stutter buffer the more latency can be hidden. However, the bigger the memory pool the higher the cost. Therefore, compression, in accordance with embodiments of the present technology, can be utilized to compress the pixel data before storing them in the stutter buffer. Compression effectively makes the memory pool size larger than it actually is allowing the stutter buffer to store more pixel data.

Embodiments of the present technology can also be extended to cases where the stutter buffer can store an entire image frame. In such cases the memory and/or the memory interface of the memory subsystem can be turned off for multiple frames if the frames are static. This enables even greater power savings in the idle case (e.g., static frames).

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended, that the scope of the invention be defined by the claims appended hereto and their equivalents.

What is claimed is:

1. A device comprising:
   a memory; and
   a processing unit including,
   a memory interface communicatively coupled to the memory;

a display logic configured to supply data to a monitor at a constant rate; and a stutter buffer communicatively connected between the memory interface and the display logic, wherein the memory interface writes display surface data from the memory to the stutter buffer faster than the display surface data is read out of the display logic to the monitor, and wherein the memory and monitor are not included in the processing unit, and wherein the memory interface enters a suspend state until a number of pixels in the stutter buffer falls below a predetermined threshold.

2. The device according to claim 1, wherein the processing unit comprises a graphics processing unit (GPU).

3. The device according to claim 1, wherein the processing unit comprises a central processing unit (CPU).

4. The device according to claim 1, further comprising compression logic, communicatively connected between the memory interface and the stutter buffer, to compress the display surface data before writing into the stutter buffer.

5. The device according to claim 4, further comprising decompression logic, communicatively connected between the stutter buffer and the display logic, to decompress the display surface data after the compressed display surface data is read out of the stutter buffer.

6. The device according to claim 1, further comprising decompression logic, communicatively connected between the stutter buffer and the display logic, to decompress compressed display surface data after the compressed display surface data is read out of the stutter buffer.

7. The device of claim 1 wherein said suspend state comprises placing said memory interface into an off state.

8. A method comprising:
transferring display surface data from a memory through a memory interface of a processing unit into a stutter buffer of the processing unit, wherein the display surface data is transferred into the stutter buffer at a first rate until the stutter buffer is substantially full;
placing the memory interface into a suspend state until the stutter buffer is substantially empty; and
transferring the display surface data from the stutter buffer through a display logic of the processing unit to a monitor, wherein the display surface data is transferred from the stutter buffer at a second rate, wherein the second rate is substantially slower than the first rate, and wherein the memory and monitor are not part of the processing unit,
wherein said placing the memory interface into a suspend state takes place during vertical blanking of the monitor.

9. The method of claim 8, further comprising:
turning the memory interface back on from a suspend state when the stutter buffer is substantially empty;
transferring additional display surface data from the memory interface into the stutter buffer at the first rate until the stutter buffer is substantially full again;
placing the memory interface into a suspend state again until the stutter buffer is substantially empty again; and transferring the additional display surface data from the stutter buffer to the display logic at the second rate.

10. The method of claim 8, wherein transferring the display surface data from a memory interface into a stutter buffer includes compressing the display surface data before writing into the stutter buffer.

11. The method of claim 10, wherein transferring the display surface data from the stutter buffer to display logic includes decompressing the display surface data after reading from the stutter buffer.

12. The method of claim 9, wherein the memory interface is in the suspend state between when transfers of the display surface data to the stutter buffer substantially fills the stutter buffer and transfers of the display surface data from the stutter buffer substantially empties the stutter buffer.

13. A device comprising:
a processing unit including:
a memory interface communicatively coupled to a memory,
wherein said memory is external to said processing unit;
a display logic communicatively configured to supply data to a monitor;
a compression logic communicatively connected to the memory interface; and
a stutter buffer, separate from said memory, communicatively connected between compression logic and the display logic, wherein the memory interface writes display surface data compressed by the compression logic to the stutter buffer faster than the display surface data is read out of the display logic.

14. The device according to claim 13, wherein the display surface data is compressed by the compression logic as a function of a predicted pixel based on one or more previous pixels and variable length encoded of a difference between the predicted pixel and a current pixel.

15. The device according to claim 13, further comprising decompression logic, communicatively connected between the stutter buffer and the display logic, to decompress the display surface data after the compressed display surface data is read out of the stutter buffer.

16. The device according to claim 13, wherein the processing unit comprises a graphics processing unit (GPU).

17. The device according to claim 13, wherein the processing unit comprises a central processing unit (CPU).

18. The device according to claim 13, wherein the memory interface enters a suspend state between when writes of the display surface data to the stutter buffer substantially fills the stutter buffer and reads of the display surface data from the stutter buffer substantially empties the stutter buffer.

19. The device according to claim 13, wherein the memory interface and memory are unavailable between when writes of the display surface data to the stutter buffer substantially fills the stutter buffer and reads of the display surface data from the stutter buffer substantially empties the stutter buffer.

* * * * *